(12) United States Patent
Xia et al.

(10) Patent No.: US 12,117,798 B2
(45) Date of Patent: Oct. 15, 2024

(54) SYSTEMS AND METHODS FOR UTILIZING ACOUSTIC SENSING TO MINIMIZE A POTENTIAL OF DAMAGE TO FIBER OPTIC CABLES

(71) Applicant: Verizon Patent and Licensing Inc., Basking Ridge, NJ (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 275 days.

(21) Appl. No.: 17/088,187

(22) Filed: Nov. 3, 2020

(65) Prior Publication Data

US 2022/0137595 A1 May 5, 2022

(51) Int. Cl.
| | | |
|---|---|---|
| G05B 19/4155 | (2006.01) | |
| G01H 9/00 | (2006.01) | |
| H04B 10/25 | (2013.01) | |
| H04Q 9/00 | (2006.01) | |

(52) U.S. Cl.
CPC ......... *G05B 19/4155* (2013.01); *G01H 9/004* (2013.01); *H04B 10/25* (2013.01); *H04Q 9/00* (2013.01); *G05B 2219/45012* (2013.01); *H04Q 2209/30* (2013.01); *H04Q 2209/86* (2013.01)

(58) Field of Classification Search
None
See application file for complete search history.

(56) References Cited

U.S. PATENT DOCUMENTS

| | | | | |
|---|---|---|---|---|
| 3,455,149 | A * | 7/1969 | Ostrander | G08B 26/00 |
| | | | | 73/654 |
| 2013/0275055 | A1* | 10/2013 | Hansen | G01M 5/0066 |
| | | | | 702/34 |
| 2016/0091465 | A1* | 3/2016 | Cooper | G01N 29/11 |
| | | | | 356/73.1 |
| 2016/0139196 | A1* | 5/2016 | Hoff | G01R 31/58 |
| | | | | 356/73.1 |
| 2016/0274064 | A1* | 9/2016 | Wysocki | G01N 29/2418 |
| 2018/0156757 | A1* | 6/2018 | Nagrodsky | G01V 1/001 |
| 2020/0124735 | A1* | 4/2020 | Huang | G01H 9/004 |
| 2020/0393290 | A1* | 12/2020 | Chen | G01H 9/004 |
| 2022/0170766 | A1* | 6/2022 | Hino | G01D 5/35358 |
| 2022/0244097 | A1* | 8/2022 | Yoda | G01H 9/004 |

FOREIGN PATENT DOCUMENTS

CN 107063339 B * 4/2019 ............ G01D 21/02

* cited by examiner

*Primary Examiner* — David Earl Ogg

(57) ABSTRACT

A device may receive sensing data that is produced by an environment associated with a fiber optic cable. Based on the sensing data, the device may determine a sensing profile, which indicates a measure of vibration as a function of distance along the fiber optic cable and as a function of time. The device may receive new sensing data produced by the environment. The device may determine that the new sensing data satisfies a vibration deviation criteria, relative to the sensing profile, for a duration threshold. By satisfying the vibration deviation criteria for the duration threshold, the new sensing data may indicate that the environment includes an activity associated with an increased likelihood of damage to the fiber optic cable relative to the sensing data. The device may perform one or more actions based on the new sensing data satisfying the vibration deviation criteria for the duration threshold.

20 Claims, 8 Drawing Sheets

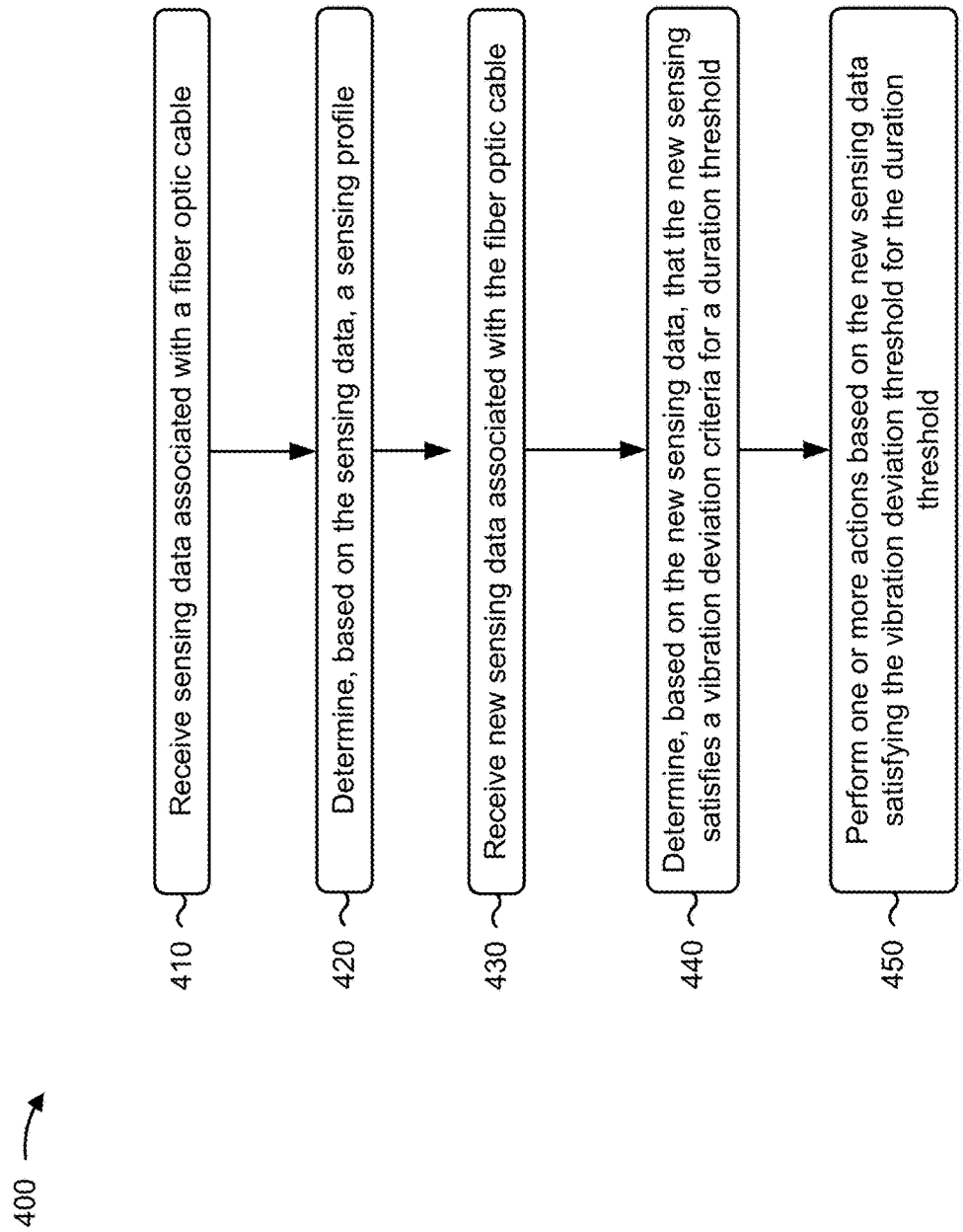

SYSTEMS AND METHODS FOR UTILIZING ACOUSTIC SENSING TO MINIMIZE A POTENTIAL OF DAMAGE TO FIBER OPTIC CABLES

BACKGROUND

A distributed acoustic sensing (DAS) system utilizes a fiber optic cable to obtain ambient vibration data associated with vibration signals along the fiber optic cable. For example, by using the fiber optic cable as a sensing element, the DAS system may obtain vibration signals (e.g., signal intensity data, frequency data, and/or the like) corresponding to each point along a length of the fiber optic cable.

BRIEF DESCRIPTION OF THE DRAWINGS

FIG. 4 is a flowchart of an example process relating to utilizing acoustic sensing to minimize a potential of damage to fiber optic cables.

DETAILED DESCRIPTION OF PREFERRED EMBODIMENTS

Figure 1A:
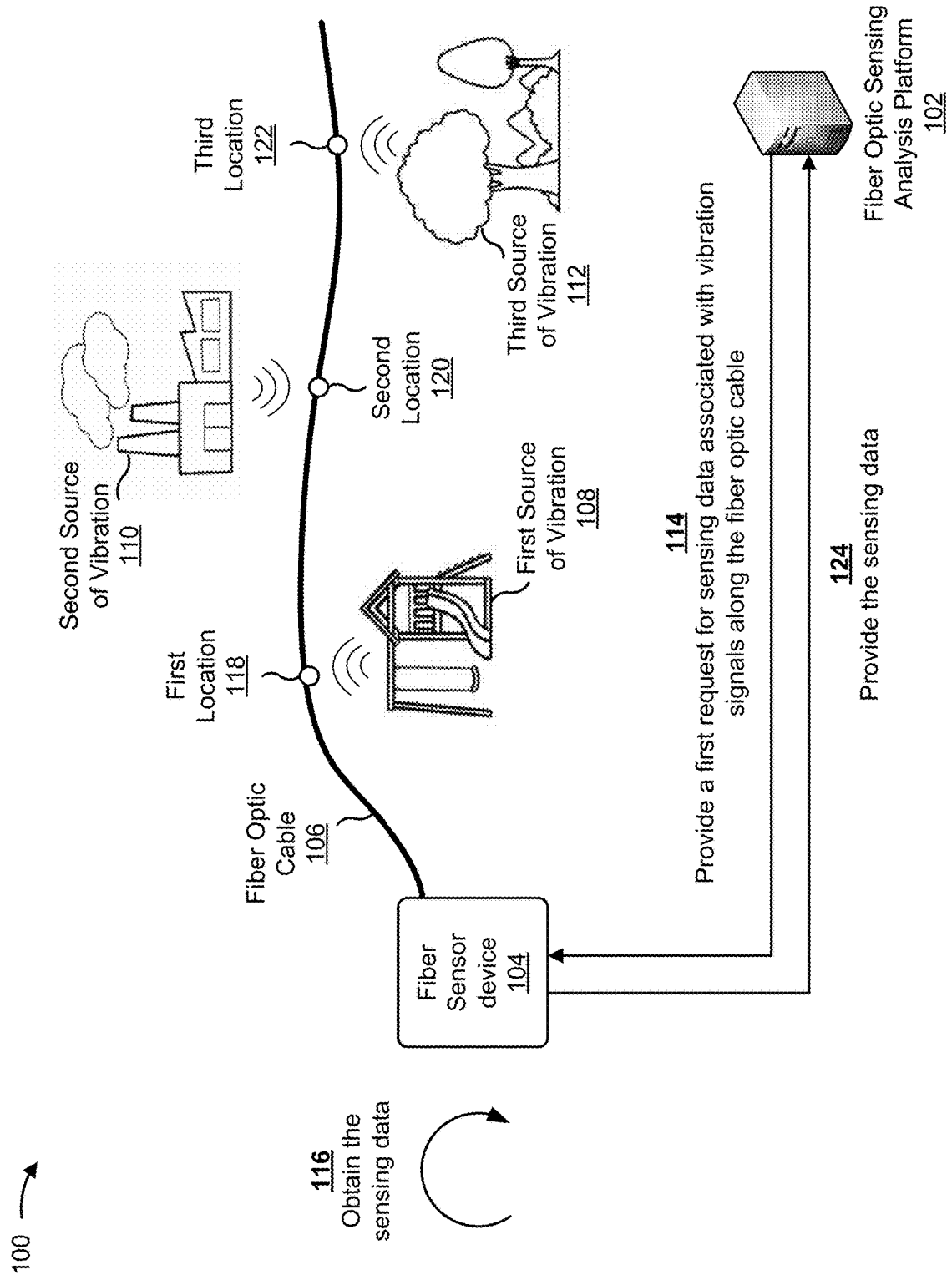
FIGS. 1A-1E are diagrams of one or more example implementations associated with utilizing acoustic sensing to minimize a potential of damage to fiber optic cables.

The following detailed description of example implementations refers to the accompanying drawings. The same reference numbers in different drawings may identify the same or similar elements.

To provide one or more services involving optical communication to a customer (e.g., fiber optic Internet, fiber optic cable, and/or the like), a service provider may route a fiber optic cable across an environment to connect the fiber optic cable to a premises of the customer. To protect the fiber optic cable (e.g., from weather conditions, animals, traffic incidents, and/or the like), the service provider may deploy the fiber optic cable underground. For example, depending on terrain and/or infrastructure within the environment, the service provider may arrange the fiber optic cable in a covered trench, within an underground duct, and/or the like.

However, because the fiber optic cable is hidden underground, a construction crew or other workers may unintentionally damage the fiber optic cable during an activity, such as excavation, construction, demolition, and/or the like. For example, a member of the construction crew, using one or more pieces of equipment to penetrate the ground (e.g., an excavator, a jackhammer, a shovel, and/or the like), may cut the fiber optic cable and thereby disrupt service. As a result, one or more devices of the customer may consume resources (e.g., computing resources, networking resources, and/or the like) attempting to re-establish connectivity, restore a session, contact the service provider, and/or the like. Additionally, the service provider may consume resources (e.g., computing resources, networking resources, vehicle resources, and/or the like) communicating with one or more customers regarding the disrupted service, investigating a source of the disrupted service, repairing the fiber optic cable, and/or the like.

Some implementations herein provide a device (e.g., a fiber optic sensing analysis platform, and/or the like) that analyzes data to identify an activity (e.g., excavation, digging, drilling, and/or the like) and generate an alert or notification in order to minimize a potential that the activity will damage the fiber optic cable. The device may receive, from a sensor device, sensing data associated with the fiber optic cable. Signals are sensed by the optical fiber where the fiber optic cable is laid and is collected over a period of time forming the sensing data. The device may determine, based on the sensing data, a sensing profile that indicates a measure of vibration as a function of distance along the fiber optic cable and as a function of time. The signals along the cable are continuously monitored and sensed signals are compared to the existing sensing profile to determine whether the sensed signals satisfy various thresholds. For example, the device may determine, based on the new sensing data, that the new sensing data satisfies a vibration deviation criteria, relative to the sensing profile, for a duration of time that exceeds the time threshold. The new sensing data, by satisfying the vibration deviation criteria for the time threshold, may indicate that the environment includes an activity associated with an increased likelihood of damage to the fiber optic cable relative to the sensing data. Based on the new sensing data satisfying the vibration deviation criteria for the duration threshold, the device may perform one or actions to prevent the activity from damaging the fiber optic cable and/or disrupting fiber optic communication.

By utilizing sensing data to prevent damage to fiber optic cable, the device may conserve resources that might otherwise have been consumed due to disrupted service. For example, the device may conserve resources that might otherwise have been consumed by the customer attempting to re-establish connectivity, restore a session, contact the service provider, and/or the like. Additionally, the device may conserve resources that might otherwise have been consumed by the service provider communicating with one or more customers regarding the disrupted service, investigating a source of the disrupted service, repairing the fiber optic cable, and/or the like.

In the description to follow, a number of values will be provided to illustrate one or more aspects of the present disclosure. However, it should be understood that such values are provided merely as an example. In practice, other values may be utilized, the values may be represented in different forms, the values may include associated units, and/or the like.

FIGS. 1A-1E are diagrams of one or more example implementations 100 described herein. As shown in FIGS. 1A-1E, a fiber optic sensing analysis platform 102 may be associated with a fiber sensor device 104, which in turn may be coupled to a fiber optic cable 106. The fiber optic sensing analysis platform 102 may include a platform that stores and processes information associated with vibration signals. The fiber sensor device 104 may be a device (e.g., a distributed acoustic sensor, a distributed vibration sensor, an optical time-domain reflectometry (OTDR) device, and/or the like) that analyzes light characteristics in association with vibration signals. The fiber optic cable 106 may be a cable capable of detecting vibration signals and/or transmitting optical communication traffic.

In FIG. 1A, the fiber optic cable 106 is deployed underground to provide an optical communication service (e.g., fiber optic Internet, fiber optic cable, and/or the like) to one or more customers of a service provider. For example, the fiber optic cable 106 may extend beneath an environment in a trench, within a duct, and/or the like. Because the fiber optic cable 106 is hidden beneath the environment, a construction crew or other workers may be unaware of the fiber optic cable 106 and, as a result, conduct an activity (e.g., excavation, digging, drilling, and/or the like) that poses a threat of damage to the fiber optic cable 106. To prevent the activity from damaging the fiber optic cable 106, the service provider may utilize the fiber optic sensing analysis platform 102, the fiber sensor device 104, and the fiber optic cable 106 (collectively referred to herein as the fiber sensing system) to identify the activity based on vibrations from the environment.

Because the fiber optic cable 106 may span large distances (e.g., in a range of approximately 40 miles to approximately 60 miles, and/or the like), the environment may include many different sources of vibration. For example, as shown in FIG. 1A, the environment may include a playground, which forms a first source of vibration 108, a factory, which forms a second source of vibration 110, a forest, which forms a third source of vibration 112, and/or the like. The first source of vibration 108, the second source of vibration 110, and the third source of vibration (collectively referred to herein as the environmental sources of vibration) may produce vibration signals at different times of day, at different days within a week, having different amplitudes, different frequencies, and/or the like. Due to additive properties of sound, vibration signals produced by construction equipment may differ based on where the construction equipment is in relation to the environmental sources of vibration and based on when the construction equipment is utilized. Furthermore, due to different installation techniques and/or different environmental conditions, the fiber optic cable 106 may have different levels of responsiveness. As a result, different segments of the fiber optic cable 106 may react differently to the same vibration.

To accurately identify construction activities despite these signal complexities, the fiber sensing system may operate in three phases. In a first phase, which will be described below in connection with FIGS. 1A-1B, the fiber sensing system may establish baseline vibration signal characteristics within the environment along the fiber optic cable 106. In a second phase, which will be described below in connection with FIGS. 1C-1D, the fiber sensing system may operate in real-time or near real-time to detect signal anomalies. In a third phase, which will be described below in connection with FIG. 1E, the fiber sensing system may perform one or more actions to verify that the signal anomalies are caused by an activity, test the fiber optic cable 106, and/or minimize a potential of damage to the fiber optic cable 106.

As shown by reference number 114 in FIG. 1A, to begin the first phase, the fiber optic sensing analysis platform 102 may provide a first request, to the fiber sensor device 104, for sensing data associated with vibration signals along the fiber optic cable 106. The first request may indicate a time period that the fiber sensor device 104 is to obtain the sensing data. For example, in order to understand how vibration signals in the environment change over time, the time period may include a plurality of days (e.g., 5 days, 30 days, and/or the like). Additionally, or alternatively, the first request may indicate one or more types of sensing data that the fiber sensor device 104 is to obtain (e.g., amplitude data, frequency data, and/or the like), a schedule for obtaining the sensing data, and/or the like.

The fiber sensor device 104, based on receiving the first request and as shown by reference number 116, may obtain the sensing data. To obtain the sensing data, the fiber sensor device 104, within the period of time, may inject a series of pulses of light into the fiber optic cable 106 and, using one or more techniques (e.g., coherent Rayleigh optical time domain reflectometry (COTDR), and/or the like), interpret backscatter from the pulses of light to map sensing data to corresponding locations along the fiber optic cable 106. For example, the fiber sensor device 104 may inject a first pulse of light, of the series of pulses of light, into the fiber optic cable 106. As the first pulse of light travels along the fiber optic cable 106, a first vibration signal produced by the first source of vibration 108 may disrupt the first pulse of light at a first location 118, causing the first pulse of light to form backscatter and return to the fiber sensor device 104. The fiber sensor device 104 may detect the backscatter from the first location 118 and analyze the backscatter to determine a first set of sensing data associated with the first vibration signal (e.g., a first amplitude, a first frequency, and/or the like).

The fiber sensor device 104 may repeat this process with a second pulse of light, a third pulse of light, and/or the like, until the fiber sensor device 104 maps the sensing data to an entire length of the fiber optic cable 106. For example, similar to that described above, a second vibration signal produced by the second source of vibration 110 may cause backscatter of a second pulse of light at the second location 120, and a third vibration signal produced by the third source of vibration 112 may cause backscatter of a third pulse of light at a third location 122. The fiber sensor device 104 may detect the backscatter from the second location 120 and the third location 122 and determine, respectively, a second set of sensing data associated with the second vibration signal (e.g., a second amplitude, a second frequency, and/or the like) and a third set of sensing data associated with the third vibration signal (a third amplitude, a third frequency, and/or the like). The fiber sensor device 104 may map the sensing data to the entire length of the fiber optic cable 106 for multiple times of day, different days, and/or the like.

As shown by reference number 124, and based on receiving the first request, the fiber sensor device 104 may provide the sensing data to the fiber optic sensing analysis platform 102. The fiber sensor device 104 may provide the sensing data in batches (e.g., on a triggered basis, on a periodic basis, on a scheduled basis, and/or the like), as a completed set of data, and/or the like. For example, the fiber sensor device 104 may indicate, for multiple times of day, multiple days, and every segment of the fiber optic cable 106 (e.g., every one-meter segment, every five-meter segment, and/or the like), a respective amplitude and frequency. In some implementations, the fiber sensor device 104 may be pre-configured to provide the sensing data to the fiber optic sensing analysis platform 102 (e.g., without receiving the first request). In such a case, the fiber sensor device 104 may update and transmit the sensing data to the fiber optic sensing analysis platform 102 according to a predetermined schedule (e.g., once every 3 months, once every 6 months, and/or the like).

Figure 1B:
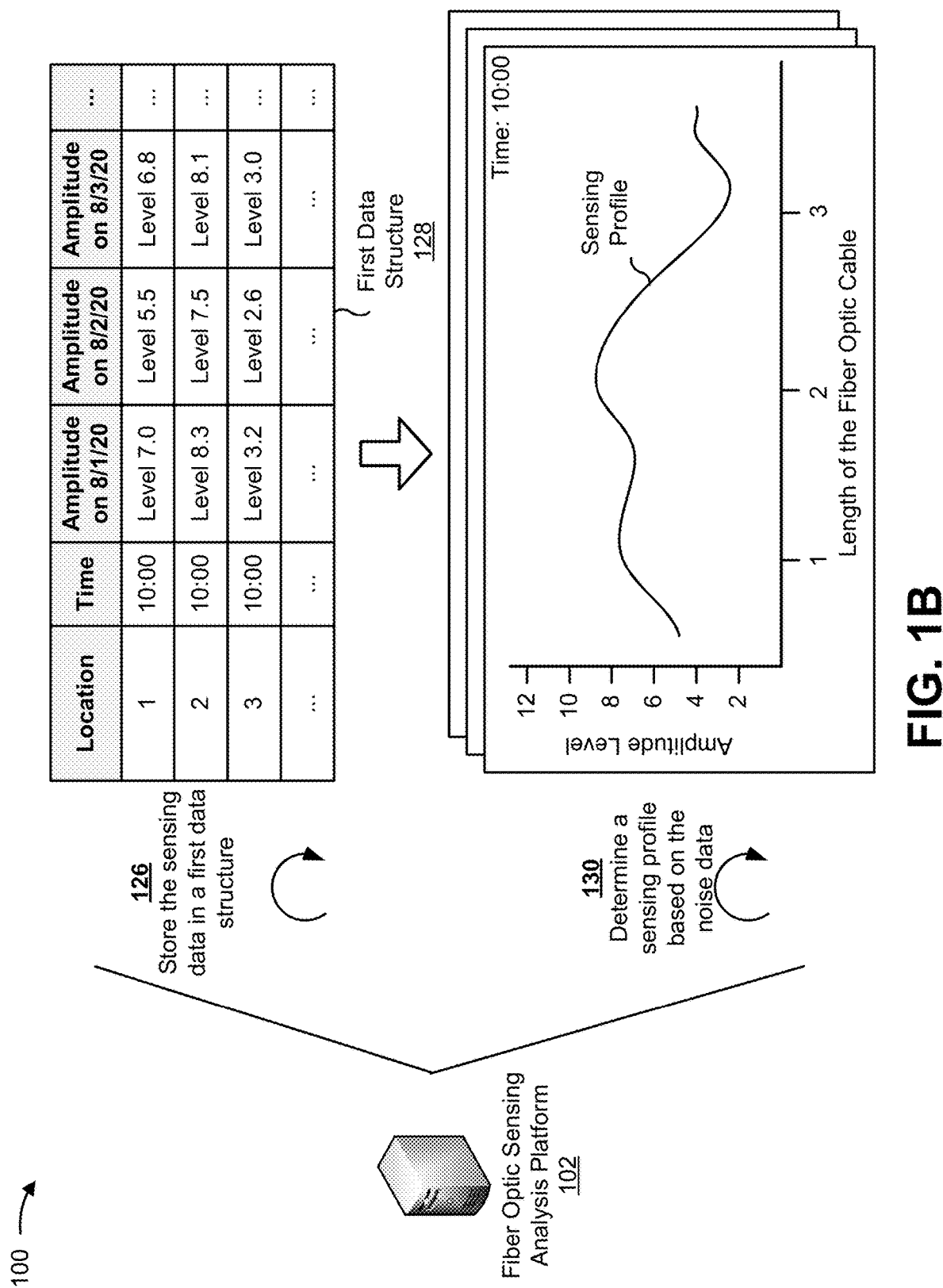

As shown by reference number 126 in FIG. 1B, based on receiving the sensing data, the fiber optic sensing analysis platform 102 may store the sensing data in a first data structure 128. For example, the first data structure 128 may indicate, with respect to the first location 118, the second location 120, and the third location 122, changes in vibrations over multiple times of day, multiple days, and/or the like. As such, in a portion of the first data structure 128, a first row may indicate, for the first location 118 at a time of 10:00 AM, a change in amplitude from Level 7.0 on August 1, to Level 5.5 on August 2, to Level 6.8 on August 3, and/or the like. A second row may indicate, for the second location 120 at the same time and on the same days, a change in amplitude from Level 8.3, to Level 7.5, to Level 8.1, and/or the like. A third row may indicate, for the third location 122, a corresponding change in amplitude from Level 3.2, to Level 2.6, to Level 3.0, and/or the like. The portion of the first data structure 128, as shown, is intended merely as a simplified example. In practice, the first data structure 128 may include additional and/or different types of sensing data (e.g., frequency) and/or sensing data associated with additional and/or different times of day, additional and/or different days, and/or the like.

As shown by reference number 130, based on the sensing data, the fiber optic sensing analysis platform 102 may determine a sensing profile to establish baseline vibration signal characteristics along the fiber optic cable 106. The sensing profile may indicate one or more measures of vibration (e.g., amplitude, frequency, and/or the like) as a function of distance along the fiber optic cable 106. Additionally, or alternatively, the sensing profile may indicate the one or more measures of vibration as a function of time. Thus, in some implementations, the sensing profile may be a multivariate data set. To determine the sensing profile, the fiber optic sensing analysis platform 102 may utilize or more data analysis techniques (e.g., a regression analysis technique, a chi-squared test technique, and/or the like) to determine representative values of the one or more measures of vibration (e.g., based on the environment being free from construction activities and/or other anomalies) at different locations along the fiber optic cable 106, different times of day, and/or the like. For example, as shown in FIG. 1B, relative to the time of 10:00 AM, the sensing profile may indicate changes in amplitude from approximately Level 7.8 at the first location 118, to approximately Level 8.4 at the second location 120, to approximately Level 2.8 at the third location 122, and/or the like. Once the fiber optic sensing analysis platform 102 has established the sensing profile that defines a standard against which new sensing data may be compared, the fiber sensing system may turn to the second phase.

Figure 1C:
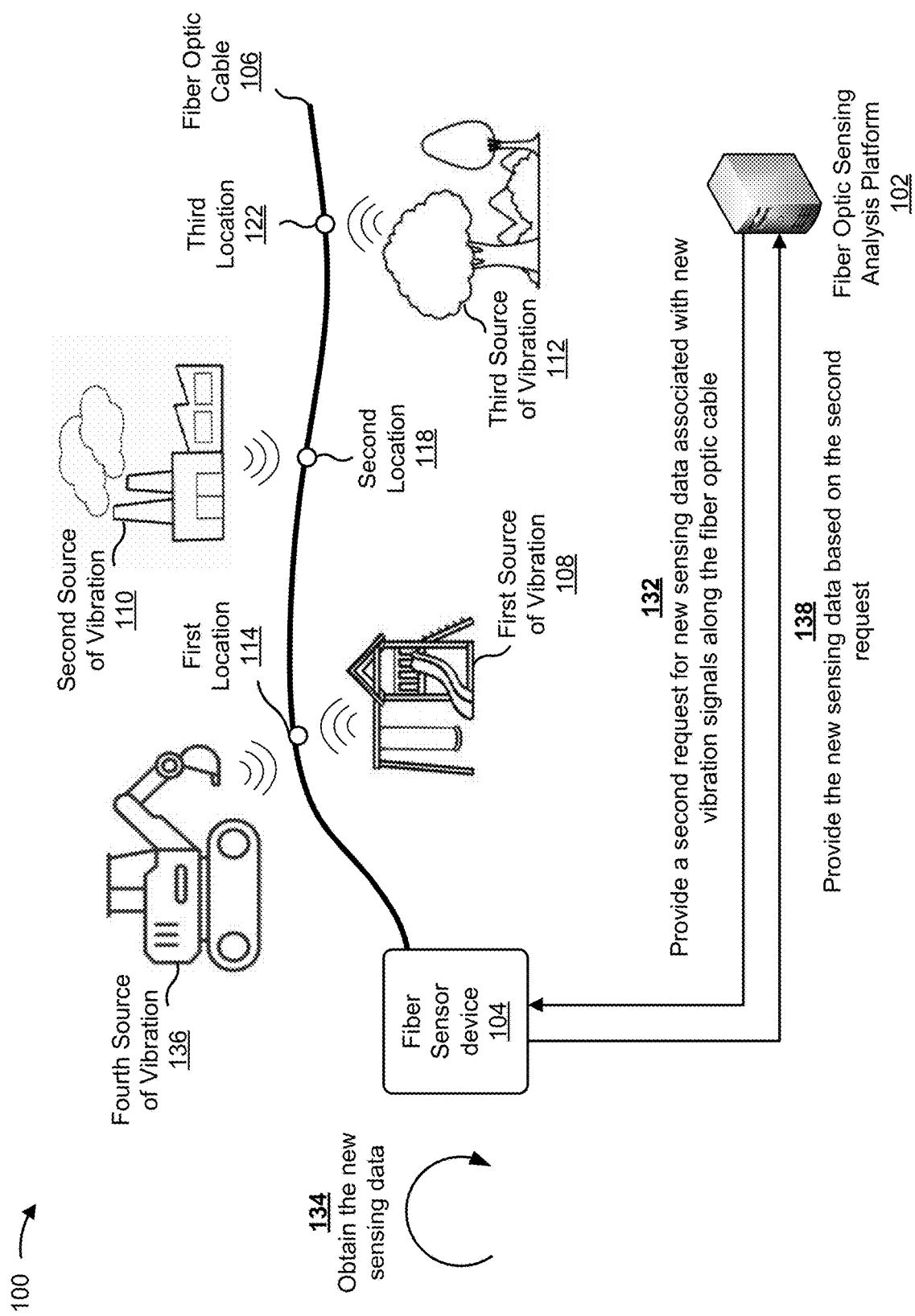

As shown by reference number 132 in FIG. 1C, to begin the second phase, which operates in real-time or near real-time, the fiber optic sensing analysis platform 102 may provide a second request, to the fiber sensor device 104, for new sensing data associated with new vibration signals along the fiber optic cable 106. The second request may indicate a schedule according to which the fiber sensor device 104 is to obtain the new sensing data and/or transmit the new sensing data. For example, the schedule may indicate the fiber sensor device 104 is to obtain and/or transmit the new sensing data every second, every 10 seconds, and/or the like. Additionally, or alternatively, the second request may indicate one or more types of new sensing data that the fiber sensor device 104 is to obtain (e.g., amplitude data, frequency data, and/or the like).

The fiber sensor device 104, based on receiving the second request and as shown by reference number 134, may obtain the new sensing data associated with the environment. In addition to the environmental sources of vibration (e.g., the playground, the factory, the forest, and/or the like), the environment may include an activity (e.g., excavation, digging, drilling, and/or the like), which forms a fourth source of vibration 136. For example, a construction crew (e.g., as part of a new construction project, a reconstruction project, an excavation project, a demolition project, and/or the like) may utilize one or more pieces of equipment to penetrate the ground near the playground. The one or more pieces of equipment may produce a fourth vibration signal. Because sound has additive properties, the fourth vibration signal may superimpose with a fifth vibration signal produced by the playground to create an aggregate vibration signal at the first location 118.

To obtain the new sensing data, similar to that described above in connection with FIG. 1A, the fiber sensor device 104 may inject a series of pulses of light into the fiber optic cable 106. Using one or more techniques (e.g., COTDR), the fiber sensor device 104 may interpret backscatter from the pulses of light to map new sensing data to corresponding locations along the fiber optic cable 106. For example, the fiber sensor device 104 may inject a first pulse of light, of the series of pulses of light, into the fiber optic cable 106. As the first pulse of light travels along the fiber optic cable 106, the aggregate vibration signal produced by the fourth source of vibration 136 and the first source of vibration 108 may disrupt the first pulse of light at the first location 118, causing the first pulse of light to form backscatter and return to the fiber sensor device 104. The fiber sensor device 104 may detect the backscatter from the first location 118 and analyze the backscatter to determine a fourth set of sensing data associated with the aggregate vibration signal (e.g., a fourth amplitude, a fourth frequency, and/or the like).

The fiber sensor device 104 may repeat this process with additional light pulses until the fiber sensor device 104 maps the new sensing data to an entire length of the fiber optic cable 106. For example, similar to that described above, a sixth vibration signal produced by the second source of vibration 110 may cause backscatter of a second pulse of light at the second location 120, and a seventh vibration signal produced by the third source of vibration 112 may cause backscatter of a third pulse of light at a third location 122. The fiber sensor device 104 may detect the backscatter from the second location 120 and the third location 122 and determine, respectively, a fifth set of sensing data associated with the second vibration signal (e.g., a fifth amplitude, a fifth frequency, and/or the like) and a sixth set of sensing data associated with the third vibration signal (e.g., a sixth amplitude, a sixth frequency, and/or the like). The fiber sensor device 104 may map the new sensing data to the entire length of the fiber optic cable 106 substantially continuously, periodically, and/or the like.

As shown by reference number 138, and based on receiving the second request, the fiber sensor device 104 may provide the new sensing data to the fiber optic sensing analysis platform 102. The fiber sensor device 104 may provide the new sensing data in batches (e.g., on a triggered basis, on a periodic basis, on a scheduled basis, and/or the like). For example, the fiber sensor device 104 may indicate, for multiple times of day and for every segment of the fiber optic cable 106 (e.g., every one-meter segment, every two-meter segment, and/or the like), a new respective amplitude and/or frequency. In some implementations, similar to that described above, the fiber sensor device 104 may be pre-configured to provide the new sensing data to the fiber optic sensing analysis platform 102 (e.g., without receiving the second request). In such a case, the fiber sensor device 104 may update and transmit the new sensing data to the fiber optic sensing analysis platform 102 according to a predetermined schedule and/or frequency.

Figure 1D:
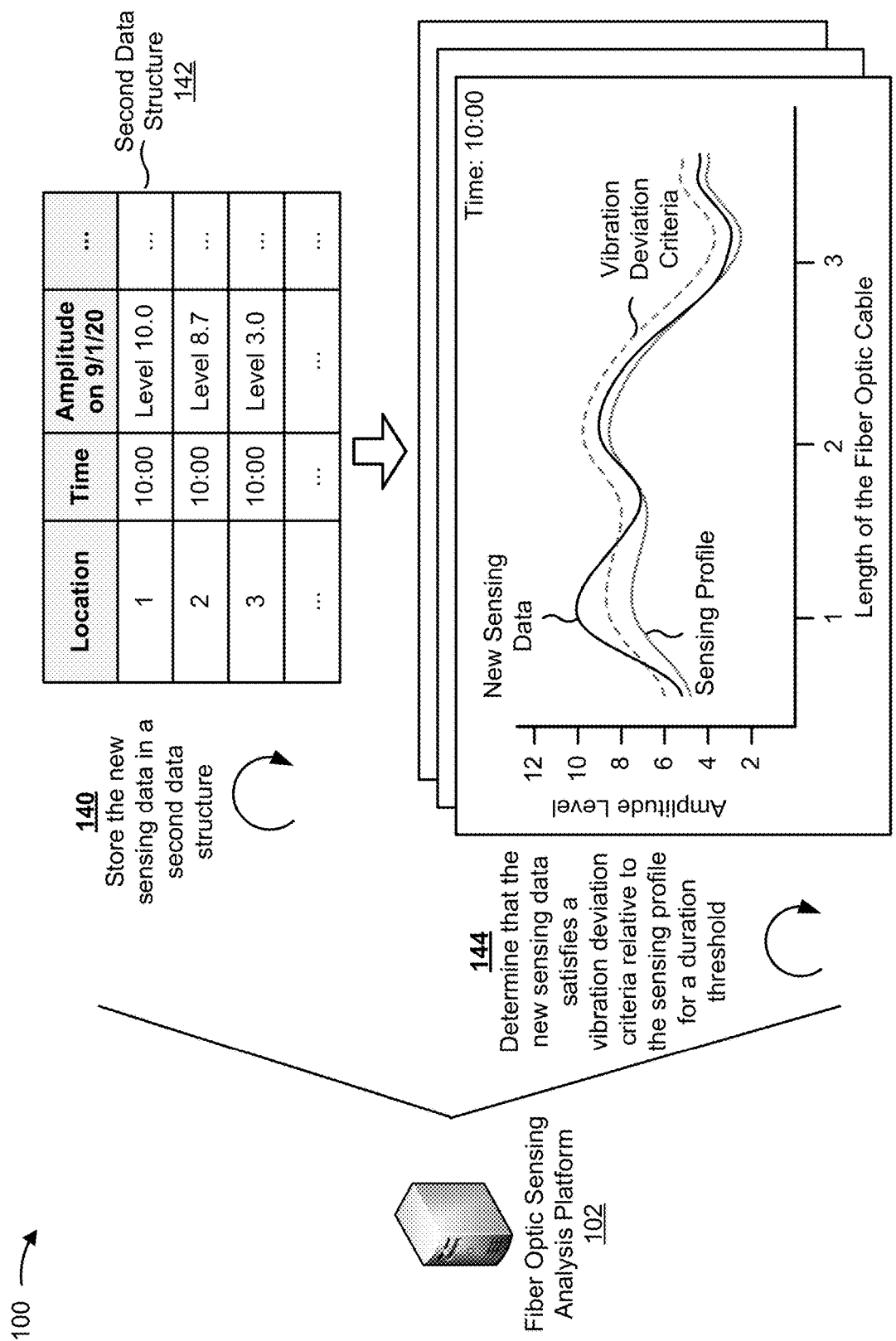

As shown by reference number 140 in FIG. 1D, based on receiving the new sensing data, the fiber optic sensing analysis platform 102 may store the new sensing data in a second data structure 142 to monitor the new sensing data relative to the sensing profile. In some implementations, the second data structure 142 may be the same data structure as the first data structure 128. As an example, and similar to that described above with respect to the first data structure 128, the second data structure 142 may indicate, with respect to the first location 118, the second location 120, and the third location 122, changes in vibration over multiple times of day, multiple days, and/or the like. As such, in a portion of the second data structure 142, a first row may indicate, for the first location 118 at a time of 10:00 AM, an amplitude of Level 10.0. A second row and a third row may respectively indicate, for the second location 120 and the third location 122, an amplitude of Level 8.7 and an amplitude of Level 3.0. The portion of the second data structure 142, as shown, is intended merely as a simplified example. In practice, the second data structure 142 may include additional and/or different types of new sensing data (e.g., frequency) and/or new sensing data associated with additional and/or different times of day, additional and/or different days, and/or the like.

As shown by reference number 144, the fiber optic sensing analysis platform 102 may determine that the new sensing data satisfies a vibration deviation criteria, relative to the sensing profile, for a duration threshold. The vibration deviation criteria, depending on the type of sensing data that defines the sensing profile (e.g., amplitude data, frequency data, and/or the like), may be a deviation threshold above and/or below the sensing profile. As used herein, satisfying the vibration deviation criteria may, depending on the context, refer to a value being greater than the deviation threshold, greater than or equal to the deviation threshold, less than the deviation threshold, less than or equal to the deviation threshold, equal to the deviation threshold, etc. So as to not trigger a response based on normal vibration variance, the deviation threshold may be in a range of, for example, approximately 8% to approximately 12% above and/or below the measure of vibration indicated by the sensing profile. For example, the deviation threshold may be in the range of approximately 8% to approximately 12% above and/or below the amplitude and/or the frequency indicated by the sensing profile. In some implementations, the fiber optic sensing analysis platform 102 may determine the vibration deviation criteria based on one or more characteristics of the sensing data, such as variance or standard deviation. In such an example, the deviation threshold may be based on not only a representative value of amplitude and/or frequency at a particular location and a particular time of day, but also on underlying sensing data. Furthermore, so as to not trigger a response based on temporary deviations in vibration (e.g., based on a vehicle passing through the environment, and/or the like), the duration threshold may be greater than or equal to approximately 5 minutes. In some implementations, the duration threshold may be greater than or equal to approximately 10 minutes. Other deviation thresholds and/or duration thresholds may alternatively be used.

For example, as shown in FIG. 1D, relative to a baseline amplitude of approximately Level 7.8 at the first location 118, the deviation threshold may be approximately Level 8.6. As such, the new sensing data, which indicates an amplitude of Level 10.0 at the first location 118, may exceed the deviation threshold. Based on the fiber optic sensing analysis platform 102 monitoring the new sensing data, the fiber optic sensing analysis platform 102 may determine that the new sensing data continues to exceed the deviation threshold until at least 10:05 AM. Because the new sensing data satisfies the vibration deviation criteria and the duration threshold, the new sensing data may indicate that the environment includes an activity associated with an increased likelihood of damage to the fiber optic cable 106 relative to the sensing data. As a result, the fiber sensing system may proceed to the third phase.

Figure 1E:
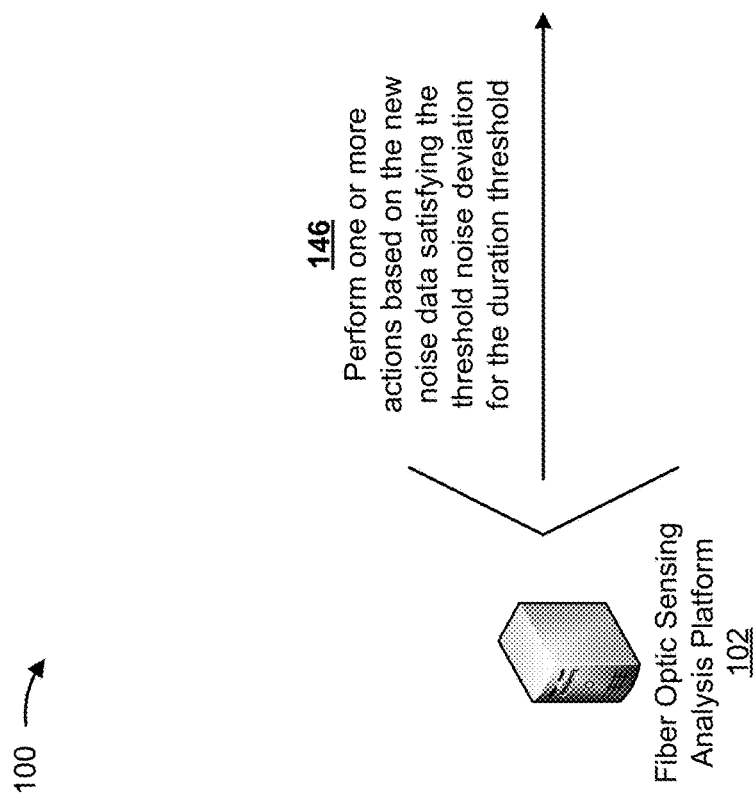

As shown by reference number 146 in FIG. 1E, as part of the third phase, the fiber optic sensing analysis platform 102 may perform one or more actions based on the new sensing data satisfying the vibration deviation criteria for the duration threshold. The fiber optic sensing analysis platform 102 may perform the one or more actions to verify the activity, verify proper functioning of the fiber optic cable 106, minimize a potential of damage to the fiber optic cable 106, and/or the like. For example, the one or more actions may include causing an autonomous vehicle to be dispatched to the first location 118 to verify that the fourth source of vibration 136 is associated with the activity. For example, the fiber optic sensing analysis platform 102 may transmit an instruction to the autonomous vehicle (e.g., an unmanned aerial vehicle). The instruction may indicate that the autonomous vehicle is to travel to the first location 118, determine whether the environment includes the activity (e.g., by using one or more sensors, one or more cameras, and/or the like), transmit a report regarding the fourth source of vibration 136 to the fiber optic sensing analysis platform 102, and/or the like. Based on receiving the report, the fiber optic sensing analysis platform 102 may determine that the fourth source of vibration 136 is the activity, thereby necessitating further action to prevent the activity from damaging the fiber optic cable 106.

To identify a geographic location of the first location 118 (and other locations along the fiber optic cable 106), the fiber optic sensing analysis platform 102 may operate in conjunction with one or more additional devices to obtain correlated location data associated with the fiber optic cable 106. For example, the one or more additional devices may include a vibration device, a measurement platform, and/or the like. In such an example, the vibration device may generate a series of vibrations having predetermined frequencies and predetermined amplitudes along a predetermined geographic route that approximates a path of the fiber optic cable 106. Similar to that described above, the fiber sensor device 104 may interpret backscatter of light from the fiber optic cable 106 to determine a distance between the first location 118 of the fiber optic cable 106 and a geographic location of a vibration. Based on the distance and the geographic location of the vibration, the measurement platform may determine the geographic location of the first location 118 along the fiber optic cable 106. The measurement platform may transmit the geographic location to the fiber optic sensing analysis platform 102.

In some implementations, the fiber optic sensing analysis platform 102 may approximate the geographic location of the first location 118 (and other locations along the fiber optic cable 106) using the sensing data and geographic data associated with the environmental sources of vibration. For example, the fiber optic sensing analysis platform 102 may obtain geographic data (e.g., an address, geographic coordinates, and/or the like) of the playground, the factory, and the forest. Based on the sensing data, the fiber optic sensing analysis platform 102 may assess, to a reasonable degree of certainty, that the first source of vibration 108 is the playground, the second source of vibration 110 is the factory, and the third source of vibration 112 is the forest. As a result, the fiber optic sensing analysis platform 102 may determine an approximate geographic location of the first location 118, the second location 120, and the third location 122.

Additionally, or alternatively, the one or more actions may include causing the fiber optic cable 106 to be tested to verify that the fiber optic cable 106 is properly functioning. For example, the fiber optic sensing analysis platform 102 may transmit an instruction to the fiber sensor device 104.

The instruction may indicate that the fiber sensor device 104 is to run a test (e.g., by injecting one or more light pulses into the fiber optic cable 106) to verify that the fiber optic cable 106 is properly functioning and the new sensing data is accurate, transmit a report based on a result of the test, and/or the like. The instruction may indicate that the fiber sensor device 104 is to run the test on an on-demand basis, on a periodic basis, on a scheduled basis, and/or the like. Based on receiving the instruction, the fiber sensor device 104 may run the test and communicate with the fiber optic sensing analysis platform 102 that the fiber optic cable 106 is properly functioning.

Additionally, or alternatively, the one or more actions may include causing an autonomous vehicle to be dispatched to the first location 118 to provide an alert regarding a potential for damage of the fiber optic cable 106. For example, the fiber optic sensing analysis platform 102 may transmit an instruction to the autonomous vehicle (e.g., an unmanned aerial vehicle). The instruction may indicate that the autonomous vehicle is to travel to the first location 118, provide the alert (e.g., auditorily, visually, and/or the like) regarding a presence of the fiber optic cable 106, transmit a report regarding the alert to the fiber optic sensing analysis platform 102, and/or the like. Based on receiving the instruction, the autonomous vehicle may provide the alert to the construction crew to cause the construction crew to cease the activity, transmit the report to the fiber optic sensing analysis platform 102, and/or the like.

Additionally, or alternatively, the one or more actions may include causing a technician to be dispatched to the first location 118 to provide an alert regarding a potential for damage of the fiber optic cable 106. For example, the fiber optic sensing analysis platform 102 may transmit an instruction to a device of the technician nearest to the first location 118. The instruction may indicate the technician is to travel to the first location 118 (e.g., via a vehicle), provide the alert to the construction crew involved in the activity, provide a report regarding the alert to the fiber optic sensing analysis platform 102, and/or the like. Based on receiving the instruction, the technician may provide the alert to the construction crew to cause the construction crew to cease the activity, provide the report to the fiber optic sensing analysis platform 102, and/or the like.

Additionally, or alternatively, the one or more actions may include sending a notification to one or more devices regarding a potential for damage to the fiber optic cable 106. For example, the fiber optic sensing analysis platform 102 may transmit the notification to a device of the technician nearest to the first location 118, to a device of a member of the construction crew, and/or the like. Based on receiving the notification, the technician and/or the member of the construction crew may cause the construction crew to cease the activity.

By analyzing sensing data to identify, in real-time or near real-time, activities that may pose a threat of damage to the fiber optic cable 106, the fiber optic sensing analysis platform 102 may protect the fiber optic cable 106. As a result, the fiber optic sensing analysis platform 102 may conserve resources that might otherwise have been consumed due to damage to the fiber optic cable 106 and/or disrupted service. For example, the fiber optic sensing analysis platform 102 may conserve resources that might otherwise have been consumed by the customer attempting to re-establish connectivity, restore a session, contact the service provider, and/or the like. Additionally, the fiber optic sensing analysis platform 102 may conserve resources that might otherwise have been consumed by the service provider communicating with one or more customers regarding the disrupted service, investigating a source of the disrupted service, repairing the fiber optic cable 106, and/or the like.

As indicated above, FIGS. 1A-1E are provided merely as examples. Other examples may differ from what was described with regard to FIGS. 1A-1E. The number and arrangement of devices and networks shown in FIGS. 1A-1E are provided as an example. In practice, there may be additional devices and/or networks, fewer devices and/or networks, different devices and/or networks, or differently arranged devices and/or networks than those shown in FIGS. 1A-1E. For example, while a single sensor device (e.g., fiber sensor device 104) has been described, it should be understood that the fiber sensing system may include a plurality of sensor devices positioned at respective segments of the fiber optic cable 106. In such an example, each of the plurality of sensor devices may be configured to communicate with the fiber optic cable 106 and the fiber optic sensing analysis platform 102. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of FIGS. 1A-1E may perform one or more functions described as being performed by another set of devices of FIGS. 1A-1E.

Figure 2:
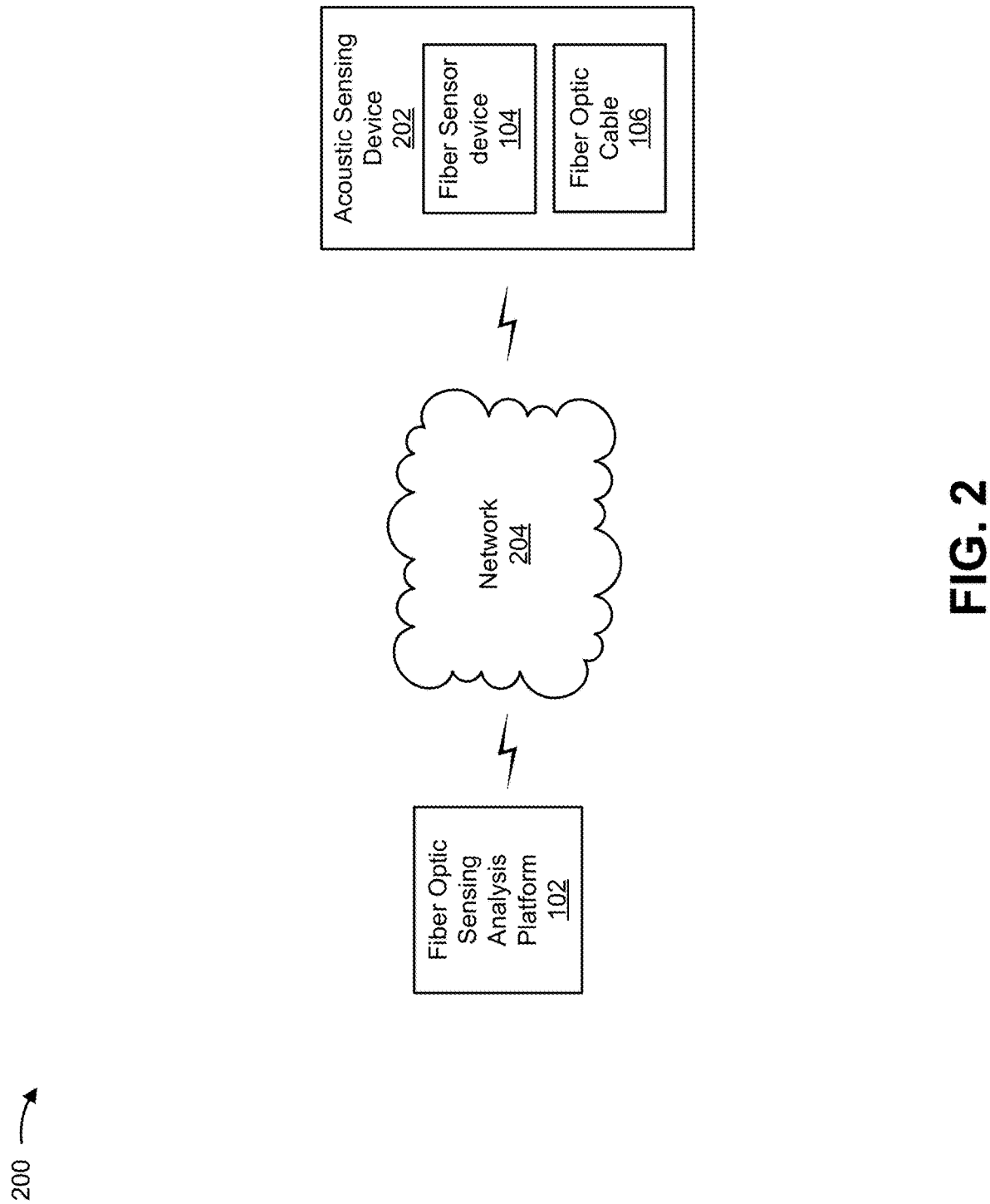
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the fiber optic sensing analysis platform 102, an acoustic sensing device 202, and a network 204. The acoustic sensing device may include the fiber sensor device 104 and the fiber optic cable 106. The devices of the environment may interconnect via wired connections, wireless connections, or a combination of wired and wireless connections.

Fiber optic sensing analysis platform 102 includes one or more devices capable of receiving, generating, storing, processing, and/or providing information associated with vibration signals. For example, the fiber optic sensing analysis platform 102 may include a server device, a laptop computer, a tablet computer, a desktop computer, a group of server devices, a cloud computing device, and/or the like. In some implementations, the fiber optic sensing analysis platform 102 may receive and process information from the acoustic sensing device 202 and/or provide information to the acoustic sensing device 202.

Acoustic sensing device 202 includes one or more devices capable of detecting vibration signals and/or receiving, generating, storing, processing, and/or providing information associated with the vibration signals. For example, as indicated above, the acoustic sensing device 202 may include the fiber sensor device 104 and the fiber optic cable 106. The fiber sensor device 104, of the acoustic sensing device 202, is a device capable of analyzing light characteristics in association with vibration signals and communicating with the fiber optic sensing analysis platform 102 regarding the vibration signals. For example, the fiber sensor device 104 may be a distributed acoustic sensing (DAS) device, such as an optoelectronic device, an optical time-domain reflectometry (OTDR) device, and/or the like. The fiber optic cable 106, of the acoustic sensing device 202, is a cable capable of being used as an acoustic sensing element and/or transmitting optical communication traffic. For example, the fiber optic cable 106 may include one or more optical fibers, along which one or more pulses of light may travel, and one or more additional materials surrounding the glass core. The acoustic sensing device 202 may detect vibration signals (e.g., via the fiber optic cable 106) and/or communicate with the fiber optic sensing analysis platform 102 regarding the vibration signals (e.g., via the fiber sensor device 104).

Network 204 includes one or more wired and/or wireless networks. For example, network 204 may include a cellular network (e.g., a long-term evolution (LTE) network, a code division multiple access (CDMA) network, a third generation (3G) network, a fourth generation (4G) network, a fifth generation (5G) network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. The network 204 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
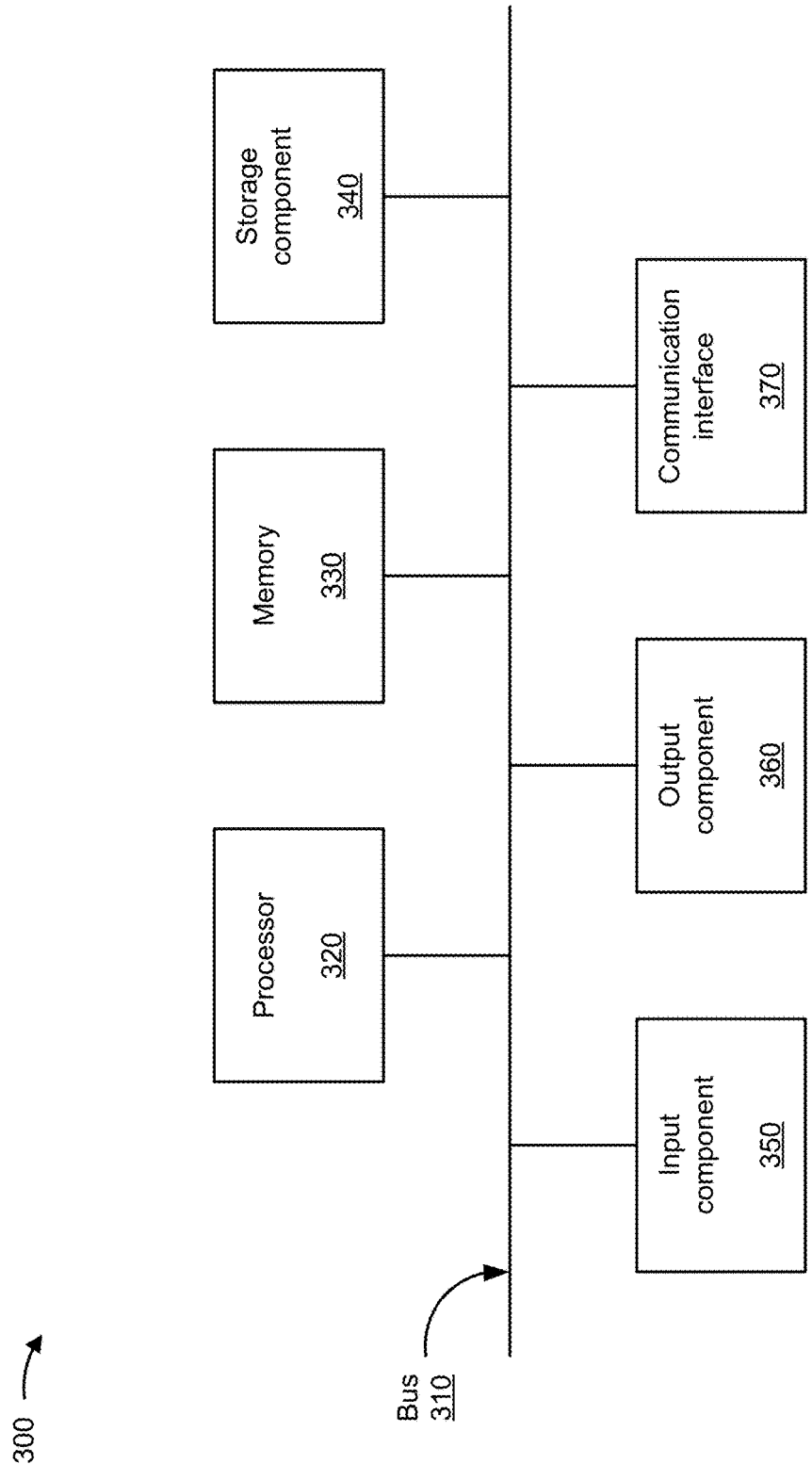
FIG. 3 is a diagram of example components of one or more devices of FIG. 2.

FIG. 3 is a diagram of example components of a device 300. Device 300 may correspond to the fiber optic sensing analysis platform 102, the fiber sensor device 104, and/or the acoustic sensing device 202. In some implementations, the fiber optic sensing analysis platform 102, the fiber sensor device 104, and/or the acoustic sensing device 202 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with systems and methods for utilizing acoustic sensing to prevent damage to fiber optic cables. In some implementations, one or more process blocks of FIG. 4 may be performed by a device (e.g., fiber optic sensing analysis platform 102). In some implementations, one or more process blocks of FIG. 4 may be performed by another device or a group of devices separate from or including the device, such as an acoustic sensing device (e.g., acoustic sensing device 202, which includes fiber sensor device 104 and/or fiber optic cable 106). Additionally, or alternatively, one or more process blocks of FIG. 4 may be performed by one or more components of device 300, such as processor 320, memory 330, storage component 340, input component 350, output component 360, and/or communication interface 370.

As shown in FIG. 4, process 400 may include receiving sensing data associated with a fiber optic cable (block 410).

For example, the device may receive sensing data associated with a fiber optic cable, the sensing data being produced by an environment associated with the fiber optic cable over a period of time, as described above. The sensing data may be received from a sensor device. The sensing data may be produced by an environment associated with the fiber optic cable over a period of time. The period of time may include a plurality of days. The sensing data may include a first set of sensing data associated with a first vibration signal that is detected at a location along the fiber optic cable. The first set of sensing data may include a first amplitude of the first vibration signal. In some implementations, the sensing data may be baseline sensing data. The baseline sensing data may be associated with vibration signals detected at a segment of the fiber optic cable. The baseline sensing data may include amplitude or frequency.

As further shown in FIG. 4, process 400 may include determining, based on the sensing data, a sensing profile (block 420). For example, the device may determine, based on the sensing data, a sensing profile, as described above. The sensing profile may indicate a measure of vibration as a function of distance along the fiber optic cable and as a function of time. The measure of vibration may include at least one of amplitude or frequency. Determining the sensing profile may include analyzing the sensing data to identify a representative value of the measure of vibration for a plurality of times of day and for a plurality of locations along a length of the fiber optic cable.

In some implementations, process 400 may include determining a deviation threshold relative to the sensing profile. The deviation threshold may correspond to a segment of the fiber optic cable. The deviation threshold may be in a range of approximately 8% to approximately 12% above and/or below the measure of vibration indicated by the sensing profile. In some implementations, the deviation threshold may be in a range of approximately 8% to approximately 12% above the first amplitude of the first vibration signal.

As further shown in FIG. 4, process 400 may include receiving new sensing data associated with the fiber optic cable (block 430). For example, the device may receive new sensing data associated with the fiber optic cable. The new sensing data may be received from the sensor device. The new sensing data may be produced by the environment associated with the fiber optic cable after the period of time. The new sensing data may include a second set of sensing data associated with a second vibration signal that is detected at the location along the fiber optic cable. The second set of data may include a second amplitude of the second vibration signal. The second set of sensing data may be produced by an activity having an increased likelihood of damage to the fiber optic cable relative to the first set of sensing data. The activity may include excavation. The second set of sensing data may be received after the first set of sensing data. In some implementations, the new sensing data may include amplitude or frequency.

In some implementations, process 400 may include monitoring the new sensing data associated with vibration signals detected at the segment of the fiber optic cable.

As further shown in FIG. 4, process 400 may include determining, based on the new sensing data, that the new sensing data satisfies a vibration deviation criteria for a duration threshold (block 440). For example, the device may determine, based on the new sensing data, that the new sensing data satisfies a vibration deviation criteria for a duration threshold, as described above. The new sensing data, by satisfying the vibration deviation criteria for the duration threshold, may indicate that the environment includes an activity associated with an increased likelihood of damage to the fiber optic cable relative to the sensing data. The duration threshold may be greater than or equal to approximately 5 minutes. In some implementations, determining that the new sensing data satisfies the vibration deviation criteria for the duration threshold may include determining that the second amplitude of the second vibration signal satisfies the vibration deviation criteria for the duration threshold. In some implementations, determining that the new sensing data satisfies the vibration deviation criteria for the duration threshold may include determining, based on monitoring the new sensing data, that the new sensing data satisfies the vibration deviation criteria at the segment of the fiber optic cable for the duration threshold. The new sensing data, by satisfying the vibration deviation criteria for the duration threshold, may indicate that the new sensing data was produced by a construction activity. The construction activity may include at least one of excavation, digging, or drilling. The deviation threshold may be greater than the amplitude of the baseline sensing data by approximately 10% of the amplitude of the baseline sensing data. The deviation threshold may deviate from the frequency of the baseline sensing data by approximately 10% of the frequency of the baseline sensing data.

In some implementations, process 400 may include determining a location of the activity based on the new sensing data. The location may be a geographic location. Determining the geographic location of the activity may be based on the location along the fiber optic cable. In some implementations, process 400 may include determining a geographic location of the segment of the fiber optic cable.

As further shown in FIG. 4, process 400 may include performing one or more actions based on the new sensing data satisfying the vibration deviation criteria for the duration threshold (block 450). For example, the device may perform one or more actions based on the new sensing data satisfying the vibration deviation criteria for the duration threshold, as described above. The one or more actions may be to prevent the activity from damaging the fiber optic cable and/or disrupting fiber optic communication. The one or more actions may include at least one of: causing an autonomous vehicle to be dispatched to the location of the activity to verify that the activity includes excavation; causing an autonomous vehicle to be dispatched to the location to provide an alert regarding a potential for damage of the fiber optic cable; causing a technician to be dispatched to the location along the fiber optic cable to provide the alert regarding the potential for damage of the fiber optic cable; causing the fiber optic cable to be periodically tested to verify that the fiber optic cable is properly functioning; or sending a notification to one or more devices regarding the potential for damage of the fiber optic cable. The one or more actions may include causing a technician or an autonomous vehicle to be dispatched to a location along the fiber optic cable to verify that the activity includes excavation and/or to provide an alert regarding a potential for damage to the fiber optic cable. Performing the one or more actions may be based on determining that the second amplitude of the second vibration signal satisfies the vibration deviation criteria for the duration threshold. In some implementations, the one or more actions may include causing a vehicle to be dispatched to the segment of the fiber optic cable to verify that the activity produced the new sensing data. The one or more actions may include causing an autonomous vehicle to be dispatched to the geographic location to provide an alert regarding a potential for damage of the fiber optic cable, or causing a technician to be dispatched to the geographic location to provide the alert regarding the potential for damage of the fiber optic cable.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from a sensor device, sensing data associated with a fiber optic cable,
      the sensing data comprising vibrations produced over a period of time in an environment associated with the fiber optic cable, and
      wherein the sensing data is associated with light characteristics;
   determining, by the device and based on the sensing data, a sensing profile,
      wherein the sensing profile indicates a measure of vibration as a function of distance along the fiber optic cable and as a function of time;
   determining, by the device, vibration deviation criteria based on one or more characteristics of the sensing profile,
      wherein the vibration deviation criteria is determined based on variance or standard deviation of the sensing data,
      wherein the vibration deviation criteria comprises a percentage range above or below the measure of vibration, and
      wherein the vibration deviation criteria is based on a representative value of amplitude or frequency at a first location along the fiber optic cable, a particular time of day, and the sensing data; receiving, by the device and from the sensor device, new sensing data associated with the fiber optic cable,
      wherein the new sensing data is produced by sources of vibration associated with the environment associated with the fiber optic cable after the period of time;
   determining, by the device and based on the new sensing data, that the new sensing data satisfies the vibration deviation criteria, relative to the sensing profile, for a duration threshold, wherein the new sensing data, by satisfying the vibration deviation criteria for the duration threshold, indicates that the environment associated with the fiber optic cable includes an activity associated with an increased likelihood of damage to the fiber optic cable relative to the sensing data, and
      wherein a response fails to be triggered before the duration threshold is satisfied; and performing, by the device, one or more actions based on the new sensing data satisfying the vibration deviation criteria for the duration threshold,
   wherein performing the one or more actions comprises:
      determining, based on geographic data associated with sources of vibration, a second location along the fiber optic cable associated with a particular source of a vibration, of the sources of vibration, associated with the new sensing data.

2. The method of claim 1, wherein the period of time includes a plurality of days; and
   determining the sensing profile comprises analyzing the sensing data to identify a representative value of the measure of vibration for a plurality of times of day and for a plurality of locations along a length of the fiber optic cable.

3. The method of claim 1, wherein the measure of vibration includes at least one of amplitude or frequency.

4. The method of claim 1, wherein the vibration deviation criteria includes a deviation threshold within a range of 8% to 12% above and/or below the measure of vibration indicated by the sensing profile.

5. The method of claim 1, wherein the duration threshold is greater than or equal to 5 minutes.

6. The method of claim 1, wherein the one or more actions include at least one of:
- causing an autonomous vehicle to be dispatched to a geographic location of the activity to verify that the activity includes excavation,
- causing an autonomous vehicle to be dispatched to the geographic location to provide an alert regarding a potential for damage of the fiber optic cable,
- causing a technician to be dispatched to the geographic location to provide the alert regarding the potential for damage of the fiber optic cable,
- causing the fiber optic cable to be periodically tested to verify that the fiber optic cable is properly functioning, or
- sending a notification to one or more devices regarding the potential for damage of the fiber optic cable.

7. The method of claim 1, wherein
the one or more actions include causing a technician or an autonomous vehicle to be dispatched to a geographic location of the activity to verify that the activity includes excavation and/or to provide an alert regarding a potential for damage to the fiber optic cable; and
prior to performing the one or more actions, the method further comprises:
determining the geographic location of the activity based on the new sensing data.

8. A device, comprising:
one or more memories; and
one or more processors communicatively coupled to the one or more memories, configured to:
receive, from a sensor device, a first set of sensing data associated with a first vibration signal that is detected at a first location along a fiber optic cable,
wherein the first set of sensing data includes a first amplitude of the first vibration signal, and
wherein the first set of sensing data is associated with light characteristics;
determine vibration deviation criteria based on one or more characteristics of the first set of sensing data,
wherein the vibration deviation criteria is determined based on variance or standard deviation of the first set of sensing data,
wherein the vibration deviation criteria comprises a percentage range above or below the first amplitude of the first vibration signal, and
wherein the vibration deviation criteria is based on a representative value of amplitude or frequency at a second location, particular time of day, and the first set of sensing data;
receive, from the sensor device, a second set of sensing data associated with a second vibration signal that is detected at the first location along the fiber optic cable,
wherein the second set of sensing data includes a second amplitude of the second vibration signal,
wherein the second amplitude of the second vibration signal satisfies the vibration deviation criteria for a duration threshold, and
wherein the second set of sensing data is produced by an activity having an increased likelihood of damage to the fiber optic cable relative to the first set of sensing data, and
wherein a response fails to be triggered before the duration threshold is satisfied; and
perform one or more actions to prevent the activity from damaging the fiber optic cable and/or disrupting fiber optic communication,
wherein the one or more actions comprise:
determining, based on geographic data associated with sources of vibration, a third location associated with a source of a vibration associated with the second set of sensing data.

9. The device of claim 8, wherein the activity is excavation.

10. The device of claim 8, wherein the one or more processors, when receiving the second set of sensing data, are configured to:
receive the second set of sensing data after receiving the first set of sensing data.

11. The device of claim 8, wherein
the vibration deviation criteria includes a deviation threshold within a range of 8% to 12% above the first amplitude of the first vibration signal; and
the duration threshold is greater than or equal to 5 minutes.

12. The device of claim 8, wherein the one or more processors, prior to performing the one or more actions, are configured to determine a geographic location of the activity based on the first location along the fiber optic cable; and
wherein the one or more processors, when performing the one or more actions, are configured to cause a technician to be dispatched to the geographic location to provide an alert regarding a potential for damage of the fiber optic cable.

13. The device of claim 8, wherein the one or more processors are further configured to:
determine, based on receiving the second set of sensing data, that the second amplitude of the second vibration signal satisfies the vibration deviation criteria for the duration threshold; and
perform the one or more actions based on determining that the second amplitude of the second vibration signal satisfies the vibration deviation criteria for the duration threshold.

14. A non-transitory computer-readable medium storing instructions, the instructions comprising:
one or more instructions that, when executed by one or more processors, cause the one or more processors to:
determine a vibration deviation criteria corresponding to a segment of a fiber optic cable,
wherein the vibration deviation criteria is determined based on variance or standard deviation of historical sensing data,
wherein the vibration deviation criteria comprises a percentage range above or below a first characteristic, and
wherein the vibration deviation criteria is based on a representative value of amplitude or frequency at a first location along the fiber optic cable and particular time of day;
monitor sensing data associated with vibration signals detected at the segment of the fiber optic cable, wherein the sensing data is associated with light characteristics;
determine, based on monitoring the sensing data, that the sensing data satisfies the vibration deviation criteria at the segment of the fiber optic cable for a duration threshold,
wherein the sensing data, by satisfying the vibration deviation criteria for the duration threshold, indicates that the sensing data was produced by a construction activity, and
wherein a response fails to be triggered before the duration threshold is satisfied; and
perform one or more actions, based on the sensing data satisfying the vibration deviation criteria for the duration threshold,
wherein the one or more actions comprise:
determining, based on geographic data associated with sources of vibration, a second location associated with a source of a vibration associated with the sensing data.

15. The non-transitory computer-readable medium of claim 14, wherein
the one or more instructions, prior to determining the vibration deviation criteria, further cause the one or more processors to receive baseline sensing data associated with vibration signals detected at the segment of the fiber optic cable; and
the one or more instructions, when determining the vibration deviation criteria, cause the one or more processors to determine a deviation threshold based on the baseline sensing data.

16. The non-transitory computer-readable medium of claim 15, wherein
the baseline sensing data and the sensing data include amplitude; and
the deviation threshold is greater than the amplitude of the baseline sensing data by 10% of the amplitude of the baseline sensing data.

17. The non-transitory computer-readable medium of claim 15, wherein
the baseline sensing data and the sensing data include frequency; and
the deviation threshold deviates from the frequency of the baseline sensing data by 10% of the frequency of the baseline sensing data.

18. The non-transitory computer-readable medium of claim 14, wherein the construction activity includes at least one of excavation, digging, or drilling.

19. The non-transitory computer-readable medium of claim 14, wherein the one or more actions include causing a vehicle to be dispatched to the segment of the fiber optic cable to verify that the construction activity produced the sensing data.

20. The non-transitory computer-readable medium of claim 14, wherein
the one or more instructions, prior to causing the one or more processors to perform the one or more actions, further cause the one or more processors to determine a geographic location of the segment of the fiber optic cable; and
wherein the one or more actions include:
causing an autonomous vehicle to be dispatched to the geographic location to provide an alert regarding a potential for damage of the fiber optic cable, or
causing a technician to be dispatched to the geographic location to provide the alert regarding the potential for damage of the fiber optic cable.

* * * * *